United States Patent [19]

Elexpuru

[11] Patent Number: 4,541,543
[45] Date of Patent: Sep. 17, 1985

[54] REGULATION AND CONTROL DEVICE FOR PRESSURE COOKERS

[75] Inventor: Manuel A. Elexpuru, Aramayona, Spain

[73] Assignee: Radar S. Coop, Escoriaza, Spain

[21] Appl. No.: 675,778

[22] Filed: Nov. 28, 1984

[30] Foreign Application Priority Data

Nov. 30, 1983 [ES] Spain ................................ 276.052
Mar. 23, 1984 [ES] Spain ................................ 278.402

[51] Int. Cl.⁴ .......................................... B65D 45/00
[52] U.S. Cl. ................................................ 220/316
[58] Field of Search ............... 220/316, 361, 367, 202, 220/203, 208, 209

[56] References Cited

U.S. PATENT DOCUMENTS

| 4,251,007 | 2/1981 | Behnisch | 220/316 |
| 4,396,130 | 8/1983 | Robinson | 220/316 |
| 4,423,825 | 1/1984 | Baumgarten | 220/316 |
| 4,512,495 | 4/1985 | Bauer et al. | 220/316 |

FOREIGN PATENT DOCUMENTS 2484817 12/1981 France .......................... 220/316

Primary Examiner—George T. Hall
Attorney, Agent, or Firm—Abelman, Frayne, Rezac & Schwab

[57] ABSTRACT

A pressure cooker has a pressure regulating control mounted on the cover handle thereof, the control, except when in its zero pressure position, acting to lock a locking mechanism supported within the top handle to prevent attachment removal of the cover from the main body of the pressure cooker.

18 Claims, 13 Drawing Figures

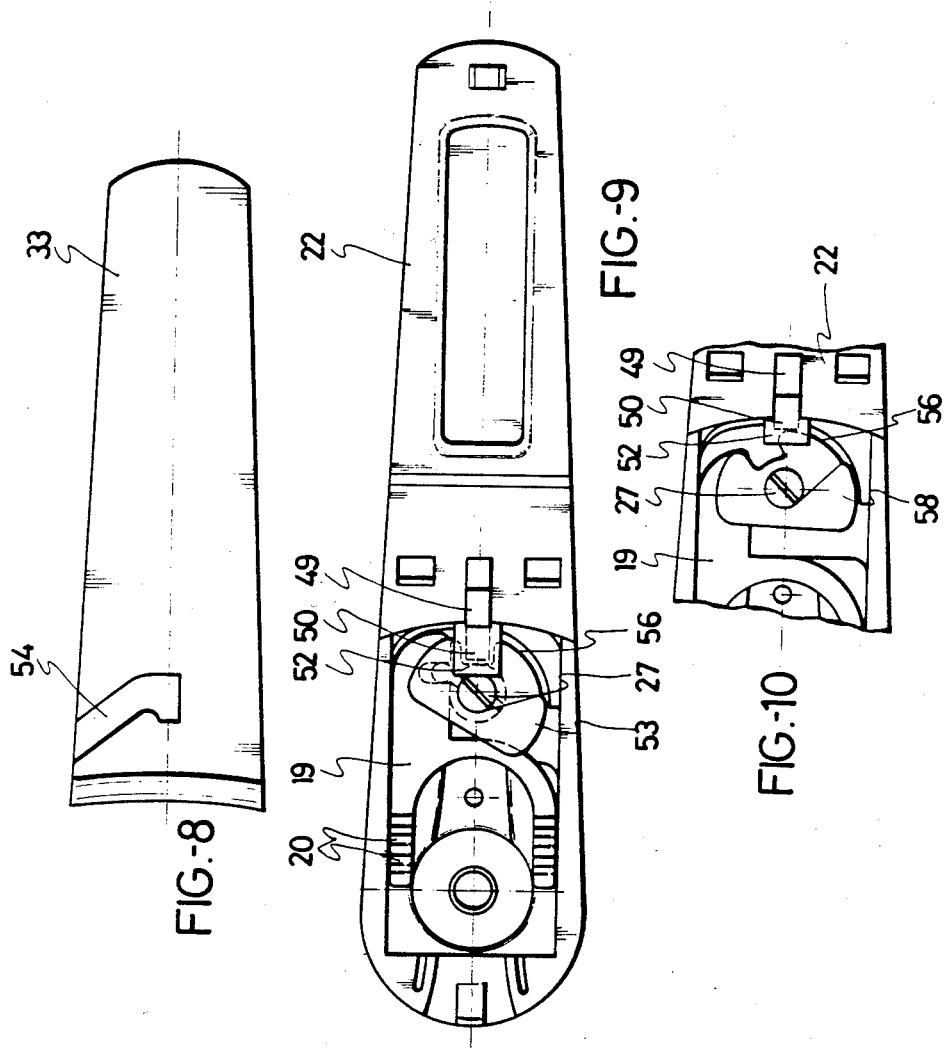

REGULATION AND CONTROL DEVICE FOR PRESSURE COOKERS

This invention, as stated in the title of this Specification, refers to a device with which pressure is correctly regulated, also assuring perfect control in the opening and closing operations of a pressure cooker.

Basically, two types of pressure cookers exist: those in which the lid is attached to the body with the aid of a bridge, assisted by a tightening device placed in the central area of the lid, and those in which a "bayonet" type coupling is arranged between the body and the lid, both elements being provided with a radial semi-handle, through which the opening and closing operations are performed, and both semi-handles being superposed in the closed position.

The device preconized is specifically intended for this second type of cooker, i.e. cookers with bayonet closures.

Obviously, all cookers are provided with a relief valve which enables the maximum pressure inside them to be limited. Cookers are also known in which there is the possibility of regulating this pressure, thus establishing different working systems for the cooker, according to the kind of product to be cooked.

Devices are also known which, the moment the cooker is opened, prior to separating the lid, act on the sealing gasket between these elements, forming a groove for the possible residual pressure inside it to be let off gently.

More specifically, in Spanish Utility Model No. 56,447, applied for in 1956, a cooker of this type was already claimed, i.e., a cooker with a bayonet type closure, provided with means for regulating the pressure for its valve device.

In Spanish Utility Model No. 130,329, in turn, a device for a cooker of this type was foreseen, designed to strain the closing gasket on starting to open the cooker, with the aim mentioned above.

Other registrations, such as Spanish Utility Models Nos. 188,946, 188,937, 188,938, 188,939, 188,947, 228,573, 228,659 and 257,542 affect the different devices comprising a cooker of the type mentioned in one way or another, always tending to maintain and potentiate the aforesaid functional features, as far as pressure regulation and control of that pressure on opening is concerned.

The device which the invention purposes constitutes a further step in the technological evolution of this type of cooker, maintaining its features regarding regulation and control, but offering greater structural simplicity, more operative reliability and a higher degree of safety, compared with conventional technology.

Basically, the device which the invention proposes is materialized in a valve unit connected to the cooker lid and provided with a pressure regulating means housed in an extension of the top handle, which partially overlaps the lid incorporating the top handle, and also a lever with which the said pressure regulating means is controlled.

The strain mechanism for the sealing gasket is also placed in the top handle, but this time in the sector forming the actual handle for opening the cooker; this mechanism is closely linked to the regulator knob so that the relation between these devices prevents the lid being closed when the lever is in any position other than the O position for opening and, in the same way, only allows it to be closed in that position.

To complete the description to be given below and to reach a better understanding of the features of the invention, a set of drawings is attached to this Specification, as an integral part thereof, in which the following has been shown, with an illustrative and unlimiting nature:

Figure 5:
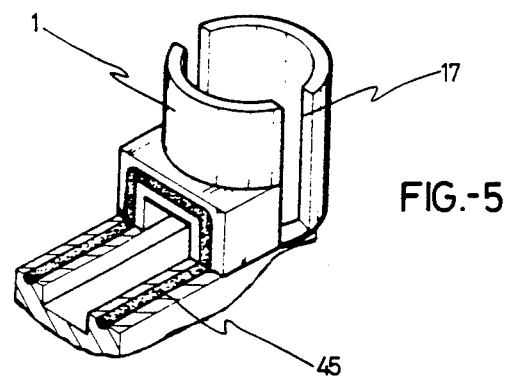

FIG. 5, according to another perspective view, shows a detail of the valve bracket, duly coupled to the respective sector of the handle, in which the sealing gasket arranged with respect to the gas outlet can be seen.

Figure 6:
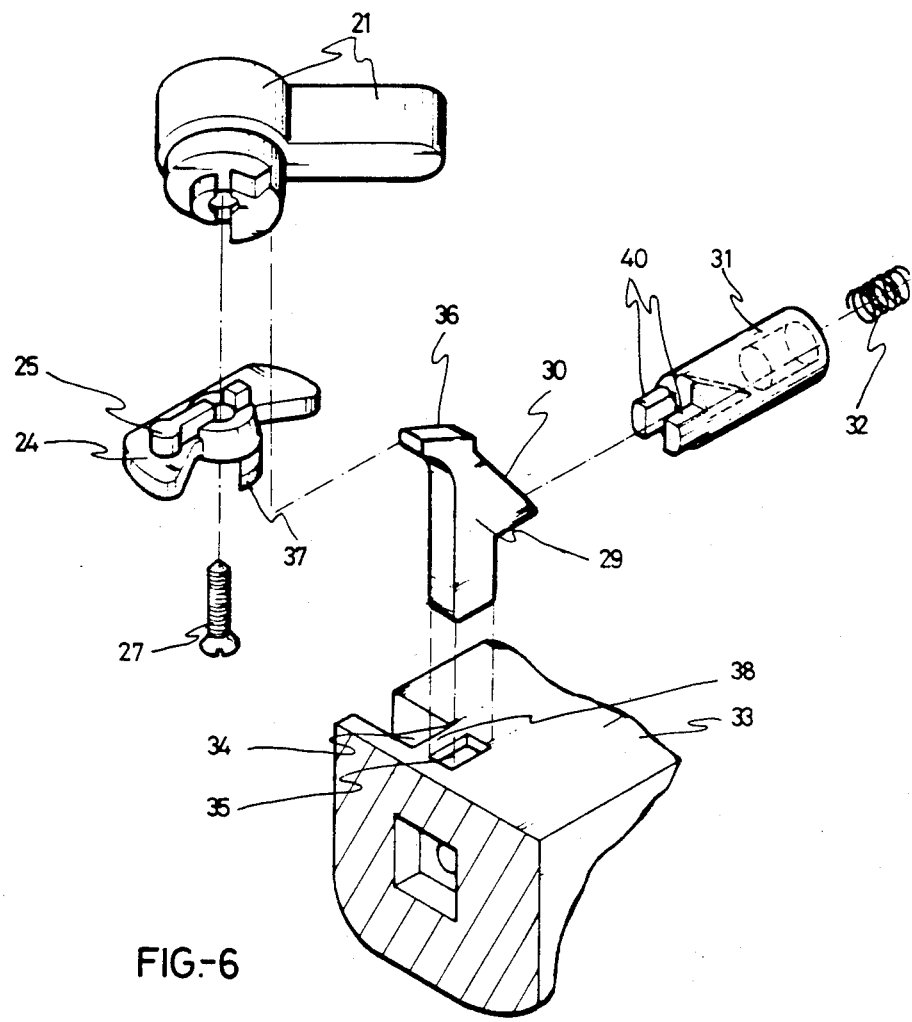

FIG. 6 shows a detail in perspective of the coupling end of the bottom handle and together with it, in an exploded view, the elements for straining the closing gasket and for blocking the lever, and also the lever itself.

Figure 1:
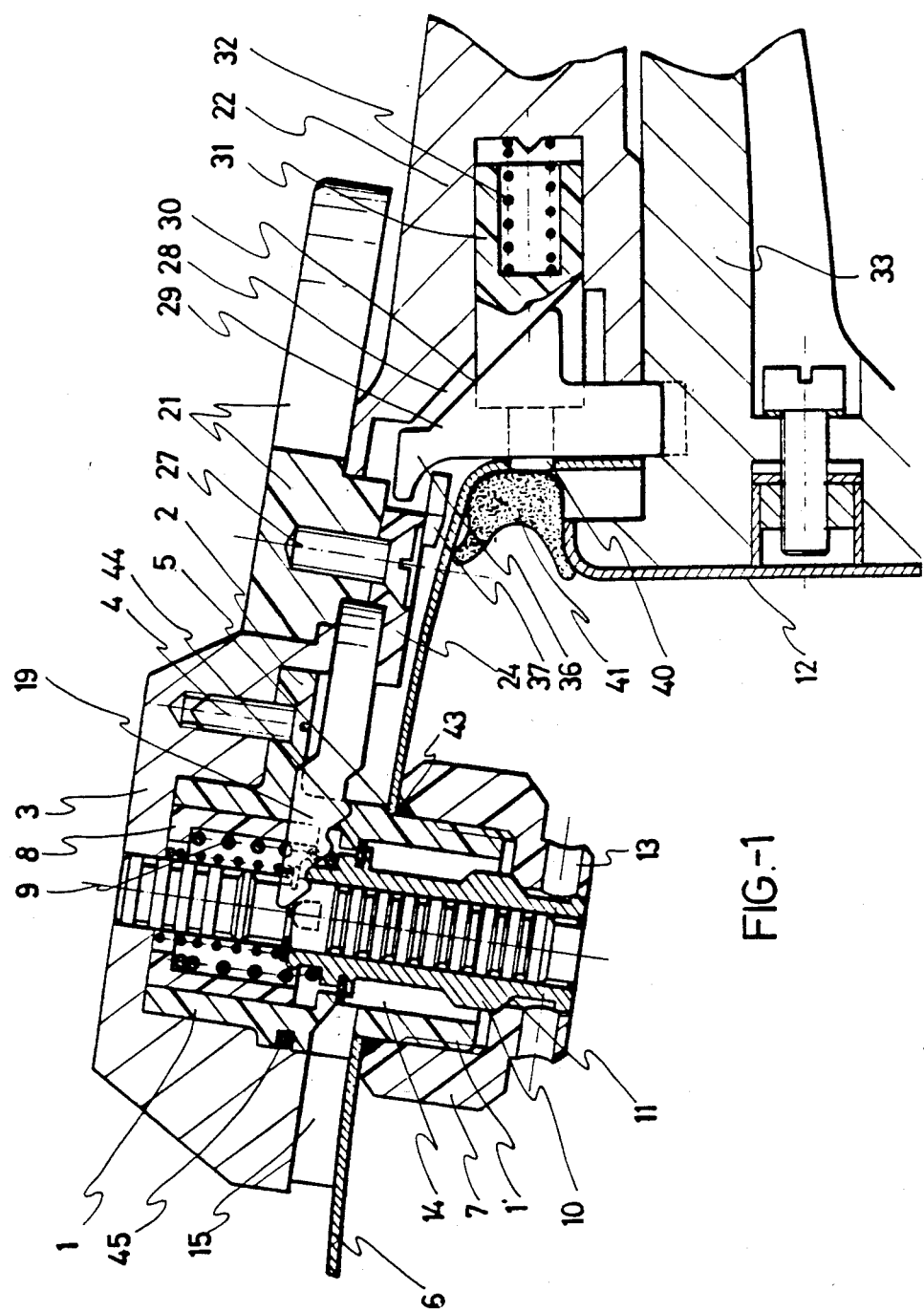
FIG. 1 shows a side elevation and cross-section view of the regulation and control device for pressure cookers, comprising the object of this invention, which appears duly connected to the cooker handles and to its body and lid, this assembly appearing in the closed position, from which the pressure can be regulated.
Figure 2:
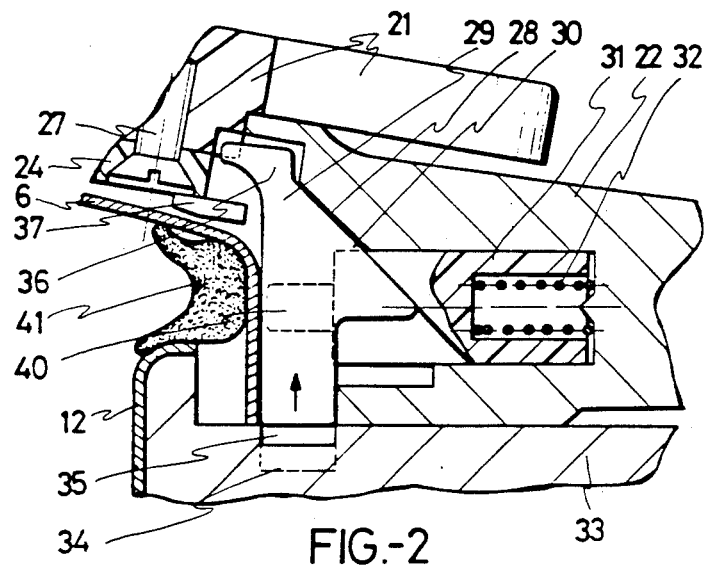
FIG. 2 shows a partial detail of the devices corresponding to opening and closing control, in an almost completely closed position, which can only be reached when the lever is in the O position.
Figure 7:
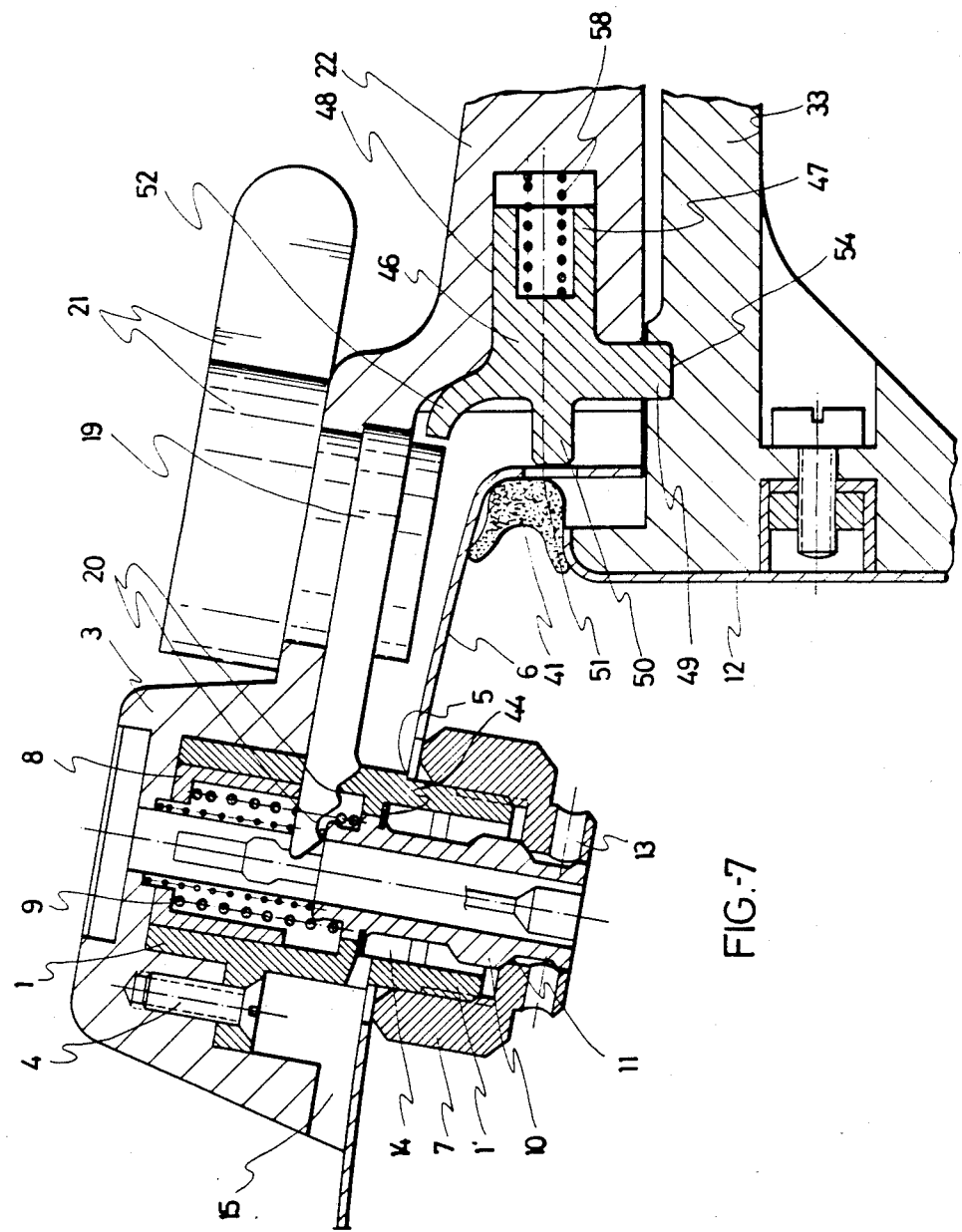

FIG. 7 shows a similar illustration to FIG. 1, according to an embodiment variation which specifically affects the blocking elements of the lid and the straining elements of the sealing gasket between the lid and body.

FIG. 8 shows a plan view of the bottom handle corresponding to the same cooker illustrated in the previous figure, in which we can see in detail the guide channel for the blocking element.

FIG. 9 shows an inner or lower plan view of the top handle of the same cooker, holding the aforesaid blocking device.

FIG. 10 shows a partial detail of the assembly illustrated in FIG. 9, corresponding to the said blocking device, and in the blocked situation, compared with the open situation illustrated in the previous figure.

Figure 11:
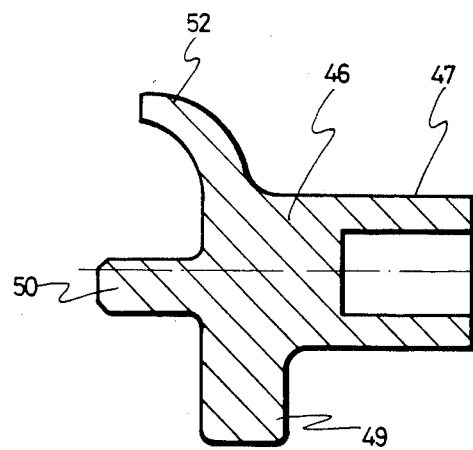

FIG. 11 shows a side elevation and cross-section view of the blocking element corresponding to this second embodiment variation.

Figure 12:
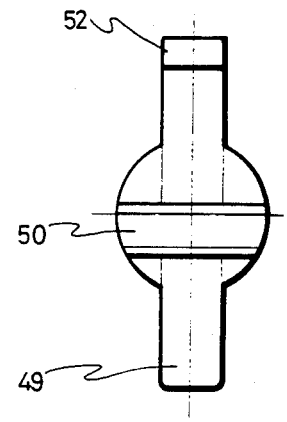

FIG. 12 shows a front elevation view of the same element.

Figure 13:
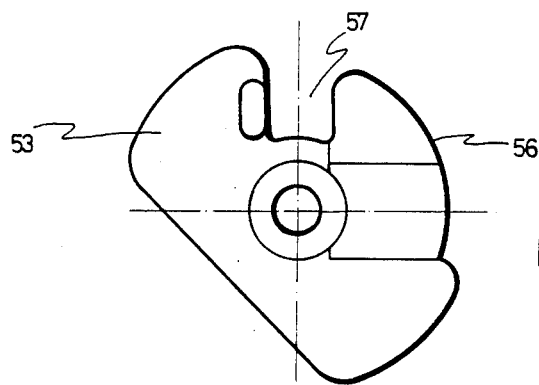

FIG. 13 finally shows an exploded detail of the cam which assists the blocking element.

Figure 4:
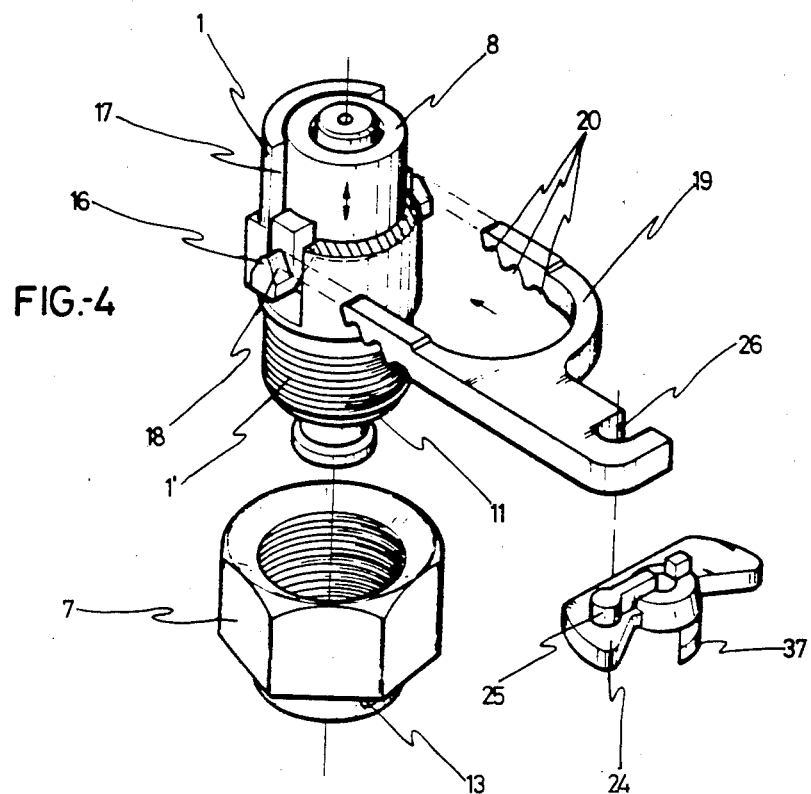
FIG. 4 shows an exploded perspective view of the valve unit and drive means for regulating the pressure inside it.

In the light of these figures, and more specifically of FIGS. 1 and 4, we can see how the valve unit is made up of a valve bracket 1, generally shaped like a cylindrical bushing with two sectors having different diameters, one corresponding to the said reference 1 and which has a side projection 2 for fixing it to the head 3 of the top handle, with the aid of a screw 4, and a second sector 1' slighly smaller in diameter, which defines a stepping 5 with respect to the previous one, through which this bracket is coupled to a hole made operatively in the cooker lid 6, said bushing being fixed to the lid with the aid of a nut 7, which forms part of the valve itself.

Inside the bracket 1 and specifically in the larger diameter top sector 1, a bushing 8 is housed, with its upper opening partly restricted, with relation to reference 8, to form a seat for the regulating spring 9, which at its other end rests on a stepping of the sealing plunger 10, coupled axially in the assembly disclosed above.

In accordance with the foregoing, the sealing plunger, through its spherical seat 11, rests on the respective seat formed in the nut, making an airtight seal, which is maintained through the effect of the pressure of the spring 9.

When the pressure inside the vessel defined by the body 12 of the cooker and its lid reaches a given value so that the thrust on the front of the plunger 10 is greater than the tension of the spring 11, this plunger rises, the seat 11 becoming independent of its complementary part and the steam leaves through the holes 13 of the perimetric chamber 14, formed between the plunger 10 and the bracket 1, and the nozzle 15 made in the handle itself, until the pressure drops to a value below the tension of the spring 9.

To regulate this pressure, the bushing 8 has been designed to shift axially in the housing made in the bracket 1, in order to shorten or lengthen the size of the spring 9, for which purpose this bushing has two diametrically opposed radial extensions 16, which emerge through grooves 17, made operatively in the direction of their generatrices in the wall of the bracket 1, forming inclined planes 18 for the arms of a fork 19 to touch, which has the bottom edge of the ends of these arms increasingly staggered; said steppings 20 define stable selective coupling areas for the side extensions 16 of the bushing 8, whereby said bushing will be capable of adopting different axial positions with respect to the bracket 1, coinciding in number with the steppings 20 existing in the arms of the fork 19 or, in other words, capable of supplying the spring 9 different tensions, coinciding with the number of steppings, corresponding to the same number of degees of pressure inside the cooker, to open the valve.

The fork 19 is driven by a lever 19 hinged onto the top handle 22, in the area where its own arm and the head 3 converge, in which the valve unit is partially housed.

An eccentric 24 is joined internally to the said lever 21, said eccentric being related through a gudgeon pin 25 to a housing 26 made operatively in the fork 19, so that the rotating movements of the lever 21 are converted into rectilinear movements of the said fork. The lever 21 is fixed to the handle in the actual fixing operation of the eccentric 24 to it, with the aid of screw 27.

Nevertheless, as mentioned above, the movements of the lever 21 to regulate the valve pressure are only possible with the cooker in the closed position; furthermore, for it to be able to reach this closed position, and also for opening it later, the lever must be in a given position, to be precise, in the "O" position, corresponding to said open and closed positions, in which the spring 9 is stretched to the maximum.

To do so, it has been foreseen that in the top handle 22, in a guide 28 made operatively for this purpose, a shiftable blocking element 29 be installed, in which an inclined plane 30 is defined, thanks to said element tending to be shifted downards through the effect of a safety shank 31, permanently depending on a spring 32, and provided with an inclined plane, with respect to 30, quoted above.

Additionally, in the bottom handle 33 a ramp or inclined plane 34 is formed, whose width coincides with that of the blocking element itself 29, and immediately afterwards, a housing 35 for the bottom end of said element 29.

Figure 3:
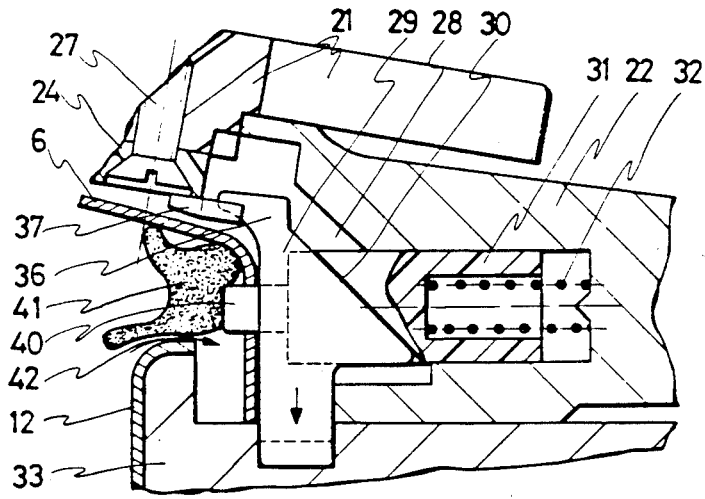
FIG. 3 shows a similar illustration to that in the previous figure, in the open position, in which the strain of the closing gasket can be seen, also showing that it is impossible to move the lever to regulate the pressure of the cooker.

In these conditions, when the cooker is in the open position, the blocking element 29 adopts the maximum lower position shown in FIG. 3, as its bottom end is free and its inner head 36, when trying to turn the lever 21, touches a stop 37, linked to the actual eccentric 24, so that it is impossible for the latter to turn and, consequently, for the lever to also.

On the other hand, when starting from the closed position, shown in FIG. 1, on trying to open the cooker, the bottom end of the blocking element 29 must leave the housing 35, rising to pass the projecting part 38 made between the said recess and the ramp 34, said upward movement, as in the previous case, only being feasible when the lever 21 is in the "O" position, as it is only possible if the head 36 of the blocking element reaches a top end position, in which it approaches the bottom base of the drive lever, obviously in the position in which the blocking element is out of line sideways with respect to the stop 37.

Hence, the cooker lid cannot be opened when the valve unit is in any position other than that intended for opening and closing it.

The safety shank 31, apart from acting as the drive element of the blocking part 29, in its resilient downward movement, stretches into two parallel arms 40, through which it passes the said blocking element 29, in the open position, shown in FIG. 3, said arms operatively facing the closing gasket 41 of the cooker and touching it and, in said open position, as also shown in FIG. 3, causing it to be strained and forming a groove 42 through which the surplus steam gently leaves through this area.

From the construction disclosed, the high degree of functional and construction safety of the device preconized can be deduced, which is completed by a series of gaskets, achieving perfect airtightness in the coupling of the lid, the steam also being inaccessible to certain parts of its mechanism.

Specifically, a layout has been provided with an O-ring 43 between the nut 7 and the lid, a flat joint 44, connected to the sealing plunger 10, which separates the steam outlet chamber 14 from the area the bushing 8 is placed, a spring 9 and regulating means of said elements, and finally a third gasket 45, which can be seen in full detail in FIG. 5, which frames the coupling of the bracket 1 to the head 3 of the top handle and from this to the lid itself 6, ensuring that the steam outlet nozzle 15 is airtight.

Contrary to the previous case, in the embodiment variation illustrated in FIGS. 7 to 13, the blocking element is capable of shifting in a transversal and not vertical direction, constituting the actual blocking element, and the drive shank being a single-part assembly, guided perfectly thanks to the likewise special configuration of a channel in the lower handle of the cooker, whose width is adapted at all times to the size of the free end of the blocking element it is to hold, which it guides according to an inclined plane which determines its projection on the closing gasket. This mixed element, i.e. for blocking and driving the gasket, is held in the blocking position with the aid of a cam, linked to the drive lever itself and which in turn blocks the free end of a top arm in it, preventing its normal radial displacement, determined by the shape of the channel corresponding to the bottom handle in any situation other than the open position.

More specifically, in this embodiment variation, the blocking device is made up of a single part 46, in which a cylindrical neck 47 is formed, guided perfectly in a housing 48 in the top semi-handle 42 and which enables its radial displacement, a lower arm 49 through which blocking between the two semi-handles 22 and 33 takes place, as will be seen below, a front shank 50 which, crossing a hole 51 in the lid, touches the gasket 41 at the right moment, causing it to be strained, and a top arm 52 through which the said part 46 is blocked, with the aid of a cam 53 linked to the drive lever 21. A channel 54 made in the bottom semi-handle 33 cooperates with the blocking part 46.

The cam 53 is linked to the actual spin axis 27 of the lever 21 and is driven simultaneously to the pressure regulating fork 19, offering as a special feature the fact that it has a broad sector 56 which is opposite the arm 52 of the blocking part 46, in any working position of the cooker, and a broad radial notch 57 opposite the said arm 52 in the "O" position of the lever 21, i.e. in the open position.

The width of the channel 54 coincides with the profile of the bottom arm 49 of the blocking part 46 and defines a markedly inclined path, clearly visible in FIG. 8, translated into the need of a substantial radial displacement of the blocking part 46 on opening, i.e. in the relative angular displacement between both semi-handles 22 and 33.

According to the foregoing, and in the open position of the lever 21, the lid 6 can be coupled to the body 12, since the arm 52 will be housed in the notch 57, in the position shown in FIG. 9. As one handle turns with respect to the other, until they are in the closed position, and correctly opposite each other, the bottom arm 49 on sliding tightly in the groove 54, causes an outer radial displacement with respect to the centre of the cooker, of the said part 46, so that the top arm 52 is separated from the bottom of the notch 57, but maintains its position opposite the latter.

After closing, on regulating the pressure to the work stage of the cooker, the cam 53 turns and, in any work position, it is its sector 56 which comes opposite the top arm 52 of the blocking part 46, thus making it impossible for the latter to shift radially, also with respect to the centre of the cooker, i.e. it is unable to vary its distance with respect to the centre of the cooker, and consequently cannot shift along the groove 54, as the tilting of the latter calls for the said radial displacement, i.e. a variation in the distance of the said part with respect to the geometrical centre of the cooker. Hence, the lid 6 remains blocked with respect to the body 12 of the cooker, it being impossible to open it in any work position of lever 21.

When the said lever is again placed in the "O" position, the notch 57 of the lever 53 again comes opposite the top arm 52, whereby the blocking part 46 can shift radially inwards as the lid is turned to the open position, displacement in which the shank 48 touches the gasket 41, straining it.

To complete the structure disclosed, the blocking part 46, in its cylindrical neck 47, is assisted by a spring 58 which does not have the conventional duty of projecting the said part towards the centre of the cooker to strain the gasket 41, but only has the purpose of avoiding possible vibrations of it and to keep the latter in the correct position when the lid and body of the cooker are separate, so that on coupling the blocking part 46 and more specifically, its bottom arm 49, it comes duly opposite the mouth of the channel 54 in the lower semi-handle 33.

From the foregoing, it can be deduced that in this second embodiment variation, the blocking of the lid and the straining of the sealing gasket is achieved by using a single part, marked with reference number 46, assisted by a small spring, whose work tension is minimum, as it has to undergo little stress.

I claim:

1. A regulation and control device for pressure cookers which, being specially designed for cookers with bayonet type closures, to whose body and lid respective semi-handles are connected, projecting sideways, which are coupled on closing and separated on opening, the top handle including an adjustable valve unit and a safety element which strains the joint made between the body and the lid when it is opened, characterized in that the valve unit, comprising basically a bracket with two sectors with different diameters, forming a stepping through which its top half is coupled to the mouth of the hole in the lid, while its bottom threaded half holds a locknut. Said bracket has a radial fin in its top half through which, with the aid of a screw, it is fixed to the head of the top handle, whereas the locknut which actually forms part of the valve has an annular spherical seat in a narrow bottom part, for an axial sealing plunger which crosses the bracket, and which includes a seat with respect to the above, said plunger thus forming an annular chamber with regard to the bracket and immediately above its seat, said annular chamber being communicated by a steam outlet nozzle placed between the head of the handle and the lid, opposite the arm of the former, with the particularity that this plunger is projected against the nut by a spring arranged between a stepping in it and the partially restricted opening of a bushing mounted and sliding inside the bracket, to be exact, in its top or outer half.

2. A regulation and control device for pressure cookers, according to claim 1, characterized in that the said bushing includes two diametrically opposed radial projections which move in vertical grooves made in the bracket and which pass the latter, forming two areas which the arms of a fork touch, which in their bottom edge have a stepped profile, of decreasing depth, so that the longitudinal displacement of the said fork leads to the intermittent movement of the bushing, with the consequent and also staggered shortening of the spring, thereby obtaining different degrees of tension according to the different pressures which the valve has to withstand, said fork being designed to be co-driven by an outer lever placed on the top handle, near its head, with an eccentric placed between, which transforms the swivel movement of said lever into the lengthwise movement of the fork.

3. A regulation and control device for pressure cookers, according to claim 1, characterized in that in the end of the arm of the top handle, corresponding to its head, with regard to the drive lever, there is a blocking element, suitably housed in a vertical groove, which has a top head capable of adopting three positions with respect to the lever-eccentric assembly, as follows: an intermediate position, corresponding to the closed situation, in which the said lever can turn freely to regulate the limit pressure of the cooker; a lower position, corresponding to the open situation, in which the head of the blocking element prevents the lever turning, thanks to a stop connected to the eccentric and which, with the change of state of the lever, touches the head of the blocking element; and a third position, in which the said blocking element occupies a bottom end position, necessary to start opening the cooker and which can only be reached when the lever is in the "O" position, corresponding to the open situation, and in which the element of the blocking head reaches the bottom base of the lever.

4. A regulation and control device for pressure cookers, according to claim 1, characterized in that the blocking element has an outer side extension, forming an inclined plane, which the safety shank touches, permanently subject to strain by a spring and also provided with an inclined plane, combined with the previous one, it being foreseen that the height of the said blocking element be determined by the separation of the two handles, in which case it adopts the bottom end position, through a ramp in the bottom handle and which the bottom end of the blocking element touches on closing, rising until it reaches its bottom end position, and by a housing also existing in the bottom handle, immediately after the said ramp, in which the end of the blocking element fits, in the closed situation, adopting its intermediate position, in which the pressure regulation lever is free.

5. A regulation and control device for pressure cookers, according to claim 1, characterized in that the said safety shank, immediately after the inclined plane touching the blocking element, stretches into side arms which frame the said element and which, when the latter moves downwards, are projected by the spring which assists the said shank, so that its front touches the sealing gasket of the cooker, causing it to be strained on opening.

6. A regulation and control device for pressure cookers, according to claim 1, characterized essentially in that the blocking device is defined through a single part in which a cylindrical neck is defined for it to be correctly guided axially in a housing made operatively in the top semi-handle, said part including a bottom arm to control it through a groove made in the bottom semi-handle, a front shank touching the sealing gasket which links the body with the lid and a top arm assisted by a cam linked to the actual axis of the drive lever, it being foreseen that the channel made in the bottom semi-handle be virtually the same width as the bottom arm of the blocking part, being sharply inclined, determining the radial projection of the said part, i.e. forming a variation in the spacing thereof, with respect to the geometrical centre of the cooker, in the relative turning between both semi-handles, radial projection which is not possible due to the cam linked to the control lever, in any working position of the cooker.

7. A regulation and control device for pressure cookers, according to claim 5, characterized in that the said cam which accompanies the control lever in its turning movement, has a sector with a large radius which is placed operatively opposite the top arm of the blocking part in any working position of the cooker, in turn determining the blocking of said part, and a second sector, with a smaller diameter, determining a broad radial notch, placed opposite in the top arm of the blocking part in the open situation, and which allows the free radial displacement of said part, determined by the inclination of the channel existing in the lower semi-handle.

8. A regulation and control device for pressure cookers, according to claim 6, characterized in that the cylindrical neck of the blocking part is assisted by a small spring which does not participate in the radial projection of said part, but which avoids possible vibrations thereof and when the lid and body are separate, establishes the correct position between said part in the situation opposite the mouth of the channel in the lower semi-handle.

9. A regulation and control device for pressure cookers, according to claim 2, characterized in that in the end of the arm of the top handle, corresponding to its head, with regard to the drive lever, there is a blocking element, suitably housed in a vertical groove, which has a top head capable of adopting three positions with respect to the lever eccentric assembly as follows: an intermediate position, corresponding to the closed situation, in which the said lever can turn freely to regulate the limit pressure of the cooker; a lower position, corresponding to the open situation, in which the head of the blocking element prevents the lever turning, thanks to a stop connected to the eccentric and which, with the change of state of the lever, touches the head of the blocking element; and a third position, in which the said blocking element occupies a bottom end position, necessary to start opening the cooker and which can only be reached when the lever is in the "O" position, corresponding to the open situation, and in which the element of the blocking head reaches the bottom base of the lever.

10. A regulation and control device for pressure cookers, according to claim 2, characterized in that the blocking element has an outer side extension, forming an inclined plane, which the safety shank touches, permanently subject to strain by a spring and also provided with an inclined plane, combined with the previous one, it being foreseen that the height of the said blocking element be determined by the separation of the two handles, in which case it adopts the bottom end position, through a ramp in the bottom handle and which the bottom end of the blocking element touches on closing, rising until it reaches its bottom end position, and by a housing also existing in the bottom handle, immediately after the said ramp, in which the end of the blocking element fits, in the closed situation, adopting its intermediate position, in which the pressure regulation lever is free.

11. A regulation and control device for pressure cookers, according to claim 2, characterized in that the said safety shank, immediately after the inclined plane touching the blocking element, stretches into side arms which frame the said element and which, when the latter moves downwards, are projected by the spring whose assists the said shank, so that its front touches the sealing gasket of the cooker, causing it to be strained on opening.

12. A regulation and control device for pressure cookers, according to claim 2, characterized essentially in that the blocking device is defined through a single part in which a cylindrical neck is defined for it to be correctly guided axially in a housing made operatively in the top semi-handle, said part including a bottom arm to control it through a groove made in the bottom semi-handle, a front shank touching the sealing gasket which links the body with the lid and a top arm assisted by a cam linked to the actual axis of the drive lever, it being foreseen that the channel made in the bottom semi-handle be virtually the same width as the bottom arm of the blocking part, being sharply inclined, determining the radial projection of the said part, i.e. forming a variation in the spacing thereof, with respect to the geometrical center of the cooker, in the relative turning between both semi-handles, radial projection which is not possible due to the cam linked to the control lever, in any working position of the cooker.

13. A regulation and control device for pressure cookers, according to claim 12, characterized in that the said cam which accompanies the control lever in its turning movement, has a sector with a large radius which is placed operatively opposite the top arm of the blocking part in any working position of the cooker, in turn determining the blocking of said part, and a second sector, with a smaller diameter, determining a broad radial notch, placed opposite in the top arm of the blocking part in the open situation, and which allows the free radial displacement of said part, determined by the inclination of the channel existing in the lower simi-handle.

14. A regulation and control device for pressure cookers, according to claim 7, characterized in that the cylindrical neck of the blocking part is assisted by a small spring which does not participate in the radial projection of said part, but which avoids possible vibrations thereof and when the lid and body are separate, establishes the correct position between said part in the situation opposite the mouth of the channel in the lower semi-handle.

15. A regulation and control device for pressure cookers, according to claim 3, characterized in that the blocking element has an outer side extension, forming an inclined plane, which the safety shank touches, permanently subject to strain by a spring and also provided with an inclined plane, combined with the previous one, it being foreseen that the height of the said blocking element be determined by the separation of the two handles, in which case it adopts the bottom end position, through a ramp in the bottom handle and which the bottom end of the blocking element touches on closing, rising until it reaches its bottom end position, and by a housing also existing in the bottom handle, immediately after the said ramp, in which the end of the blocking element fits, in the closed situation, adopting its intermediate position, in which the pressure regulation lever is free.

16. A regulation and control device for pressure cookers, according to claim 3, characterized in that the said safety shank, immediately after the inclined plane touching the blocking element, stretches into side arms which frame the said element and which, when the latter moves downwards, are projected by the spring which assists the said shank, so that its front touches the sealing gasket of the cooker, causing it to be strained on opening.

17. A regulation and control device for pressure cookers, according to claim 13, characterized in that the cylindrical neck of the blocking part is assisted by a small spring which does not participate in the radial projection of said part, but which avoids possible vibrations thereof and when the lid and body are separate, establishes the correct position between said part in the situation opposite the mouth of the channel in the lower semi-handle.

18. A regulation and control device for pressure cookers, according to claim 4, characterized in that the said safety shank, immediately after the inclined plane touching the blocking element, stretches into side arms which frame the said element and which, when the latter moves downwards, are projected by the spring which assists the said shank, so that its front touches the sealing gasket of the cooker, causing it to be strained on opening.

* * * * *